(12) United States Patent
Barland

(10) Patent No.: US 10,066,687 B2
(45) Date of Patent: Sep. 4, 2018

(54) CALIPER COVER

(71) Applicant: Michael Barland, Chula Vista, CA (US)

(72) Inventor: Michael Barland, Chula Vista, CA (US)

(*) Notice: Subject to any disclaimer, the term of this patent is extended or adjusted under 35 U.S.C. 154(b) by 0 days.

(21) Appl. No.: 15/711,425

(22) Filed: Sep. 21, 2017

(65) Prior Publication Data
US 2018/0010656 A1 Jan. 11, 2018

Related U.S. Application Data

(60) Provisional application No. 62/404,080, filed on Oct. 4, 2016.

(51) Int. Cl.
B60T 1/06 (2006.01)
F16D 65/00 (2006.01)
F16D 55/00 (2006.01)

(52) U.S. Cl.
CPC ..... *F16D 65/0081* (2013.01); *F16D 65/0031* (2013.01); *F16D 2055/0037* (2013.01)

(58) Field of Classification Search
CPC .. F16D 65/0081; F16D 65/0031; F16D 65/00; F16D 65/128; F16D 2065/13; F16D 2065/1304; F16D 2065/2065; F16D 2065/134; F16D 65/78; F16D 65/84; F16D 2300/021; F16D 2300/0212; F16D 2055/0037
USPC ........................ 188/18 A, 73.1, 73.31, 73.32, 188/73.36–73.38, 206 R, 218 A, 218 R, 188/218 XL
See application file for complete search history.

(56) References Cited

U.S. PATENT DOCUMENTS

| | | | | |
|---|---|---|---|---|
| 2,527,072 A * | 10/1950 | Pogue | ...................... | B61H 5/00 188/206 R |
| 3,605,956 A * | 9/1971 | Hahm | ................. | F16D 65/0977 188/216 |
| 5,538,105 A * | 7/1996 | Rike | ..................... | F16D 55/228 188/73.31 |
| 5,601,171 A * | 2/1997 | Flotow | .................. | F16D 13/385 188/73.32 |
| D476,275 S * | 6/2003 | Winkler | .................. | F16D 55/22 D12/180 |
| D515,484 S * | 2/2006 | Winkler | ....................... | D12/180 |
| 9,046,143 B2 * | 6/2015 | Barland | ............. | F16D 65/0031 |
| 2004/0016610 A1* | 1/2004 | Morris | .................. | F16D 65/095 188/73.31 |
| 2004/0074716 A1* | 4/2004 | Brumfield | ............... | F16D 55/22 188/218 A |
| 2005/0258008 A1* | 11/2005 | King | ..................... | F16D 65/00 188/264 R |
| 2005/0284710 A1* | 12/2005 | Roberts | ................. | F16D 55/226 188/73.1 |
| 2008/0067016 A1* | 3/2008 | Pritz | .................... | F16D 55/225 188/73.38 |

(Continued)

*Primary Examiner* — Pamela Rodriguez
(74) *Attorney, Agent, or Firm* — Donn K. Harms

(57) ABSTRACT

A caliper cover having a first support member and second support member engaged on a first mount and second mount affixed to opposite sides of a brake caliper. The first and second mounts are held engaged by the fixed spacing of the first and second member. Enhanced engagement is provided through a declining gap formed between opposing first and second portions of the mounts.

14 Claims, 3 Drawing Sheets

(56) References Cited

U.S. PATENT DOCUMENTS

2008/0110707 A1* 5/2008 Kromer ................... F16D 65/00
                                                         188/218 A
2009/0321198 A1* 12/2009 Barland .............. F16D 65/0031
                                                         188/264 A

* cited by examiner

CALIPER COVER

This Application claims priority to U.S. Provisional Patent Application Ser. No. 62/404,080, filed on Oct. 4, 2016, which is incorporated herein in its entirety by this reference thereto.

FIELD OF THE INVENTION

The disclosed device concerns brake calipers employed on motor vehicles such as such as cars and trucks. More particularly, the device relates to a caliper cover engagement system which includes a pair of caliper-engaging mounts which are configurable for fixed or adjustable engagement in an engagement with a pair of support members extending from a caliper cover for positioning covering the brake caliper.

BACKGROUND OF THE INVENTION

Motor vehicles have, since their inception, required a means for slowing and stopping the vehicle. Over time, two types of brake systems developed for that purpose. One such system is the drum brake, which uses friction caused by a set of opposing shoes or pads when they press outward against a rotating cylinder-shaped drum to which the wheel is engaged. In more recent times, a second mode of wheel braking developed using calipers which compress opposing pads upon a rotor engaged with the wheel.

Caliper braking has proven to be a significant improvement over drum brakes and is conventionally employed on at least the front wheels of modern autos and truck. In use, the two opposing pads are compressed against the perimeter of a rotor engaged to the axle of the wheel they are intended to brake. In use, a pressing of the brake pedal on the vehicle, causes the caliper holding the opposing pads to compress against the rotor thereby slowing the wheels and the vehicle.

While the employment of calipers with opposing pads in disk brake systems improves braking, there are a number of problems associated with such systems from an owner's standpoint. Unlike drum brakes which tend to prevent dust from the shoes from contacting the wheel rim, calipers inherently eject brake shoe dust onto the wheel and caliper during use due to the open caliper and force of the rotor running through it. The dust is the byproduct of the frictional engagement of the brake pads with the spinning rotor during stopping of the wheel. While functionally not a serious problem, most drivers consider the brake dust unsightly on the caliper when viewed through holes in the wheel. Further, many drivers consider the caliper itself unsightly.

Other problems associated with braking systems employing calipers and rotors are heat generation during from the frictional engagement of the brake discs with the rotor and, additionally, the communication of the dust from the brake pads not only to the caliper but to a sticky engagement upon the wheels and surface of the car and surrounding wheel well.

Prior solutions in the art, with regard to the caliper dust problem, employed covers for the calipers in an attempt to hide them from view and to limit dust communication. However, previous caliper covers generally glue to the caliper which is unsafe and hard to remove or provide for a single mount with no adjustment for the cover closer or further from the wheel. Additionally, some such covers require the removal of the caliper from its mount and the employment of special tools and mounting components to provide a mount for the caliper cover.

Removing the caliper is beyond the scope of most owner's skills and tool collections. Other caliper covers have been disclosed using connectors to an edge of the caliper. However, while such may have provided an easily engaged caliper cover mount, such connections don't allow for translation of the caliper along the line of the wheel axle to allow the user to translate the cover toward or away from the exterior caliper surface to accommodate thicker calipers, or to position the cover to avoid contact with interior of wheels which might otherwise contact the cover when engaged too close thereto.

Provided herein is a caliper cover mounting system which will engage and disengage easily with a brake caliper by a simple engagement on both sides of a caliper above the path of travel of the rotor through the caliper where the mount will not encounter the brake pads during activation of the caliper. The system herein is configured to easily engage with existing edges of the caliper above the path of the rotor therethrough, in a frictional and secure engagement not easily dismounted once so engaged. Cover position can be accomplished by translation of a mounting member to thereby move the cover within a distance between the engaged wheel and the exterior surface of the caliper.

SUMMARY OF THE INVENTION

The device as herein disclosed and described provides a caliper cover system which includes a caliper cover which is configured with a pair of mounts, each of which are configured for easy removably engagement to a mounting position on opposing sides of the caliper. This mounting position is adjacent a path through the caliper for the rotor, which eliminates the possibility of contact with the caliper brake pads, with either of the mounts once engaged. By providing a pair of frictionally engageable mounts which are configured once engaged to both sides of a caliper, to hold that engagement, the caliper cover and mounts of the system herein, are easily installed and within the mechanical abilities of a significantly increased number of users.

The caliper cover system herein includes two removably engageable mounts. Each of these mounts extending from the cover, are configured for engagement with two respective support mounts attached to opposite sides of a caliper cover. The two support mounts are defined by a body which has a first section engaged with a protecting threaded member, which is engaged with a second section by a central portion therebetween. The second portion extends at a slight angle toward the first portion of the body from an engagement with the central portion of the body. The central portion may angle downward and away from the first section to its attachment with the second section, to for an angled engagement which mirrors and angled surfaces of the caliper to which it engages.

The incline or angle of the second portion of each body defining the mounts, toward the first portion, forms the second portion in a fashion adapted to clip under a lower edge of the brake caliper. The lower edge of the caliper is adjacent an area where the exterior circumference of the rotor passes through the caliper. Once so clipped, the width the first portion of the body of the mount in contact with a planar area of the caliper, the second portion will incline upward from the edge of the caliper making thereby forming an enhanced biased engagement therewith which requires force sufficient to bend the second portion temporarily away from the first portion, during removal of each mount.

Each of the two mounts is preferably configured to be placed in a biased frictional engagement with the caliper on opposite sides of the caliper, above and adjacent to passage of the circumferential edge of the rotor therethrough. Each of the two mounts once engaged with a respective side of the caliper, will have a second portion positioned within a cavity of the caliper and angling from the central portion toward a distal end along a line angling away from the rotor. Once so engaged this second portion thus which will require sufficient force to temporarily straighten, in order to remove the mount.

At the first portion of body forming the mount upon the caliper, is the threaded member which is engaged at a first end and projects to a distal end from the first portion of the body. This threaded member is configured for engagement with a threaded nut to form a sandwiched engagement of a support member connected to the cover therebetween. This configuration of a projecting threaded member, which is sized to communicate through an aperture in the support member of the cover, and threaded for engagement with the nut, is preferred. This is because it provides an especially secure mount to the caliper in combination with the biased engagement and the angled second portion which if included must be forced to straighten for removal.

Additionally, by placing the projection member to extend from the first portion of the body of each mount, the aperture in one or both support members connected to the cover, may be elongated to a slot and thereby allow lateral translation of the cover in-between the exterior surface of the caliper and an interior surface of a wheel engaged to the axle on which the caliper is engaged.

The cover member is preferably curved out of plane around at least three edges such that when mounted the three curved edges angle toward the exterior surface of the caliper to which it is engaged. The curvature helps block the view of the caliper when viewed through the slots of the wheel of the axle the caliper engages. The curved surface urge incoming air through a gap between the cover and caliper and tend to vent brake dust rearward out the back of the gap closest to the rear of the vehicle.

It is thus an object of this invention to provide a caliper cover system which employs two mounts having a width, thickness and shape, which is configured to engage opposing sides of the caliper adjacent the rotor path therethrough.

It is a further object of this invention to provide such a caliper system which forms the mounts with an inward deflection of a second portion to enhance the engagement to the caliper.

It is a further object of this invention to provide such a caliper cover system where the mounts have a threaded member which communicates through an aperture on support members for the cover, which allows for adjusting of the distance of the cover along a line between the caliper and wheel.

With respect to the above description and background, before explaining at least one preferred embodiment of the invention in detail, it is to be understood that the invention is not limited in its application to the details of construction and to the arrangement of the components and/or steps set forth in the following description or illustrated in the drawings. The various apparatus and methods of the invention herein described and disclosed are capable of other embodiments and of being practiced and carried out in various ways which will be obvious to those skilled in the art once they review this disclosure. Also, it is to be understood that the phraseology and terminology employed herein are for the purpose of description and should not be regarded as limiting.

As such, those skilled in the art will appreciate that the conception upon which this disclosure is based may readily be utilized as a basis for designing other devices, methods and systems for carrying out the several purposes of the present disclosed device for providing an easily mounted yet securely engaged caliper cover. It is important, therefore, that the objects and claims be regarded as including such equivalent construction and methodology, insofar as they do not depart from the spirit and scope of the present invention.

DETAILED DESCRIPTION OF PREFERRED EMBODIMENTS

Figure 1:
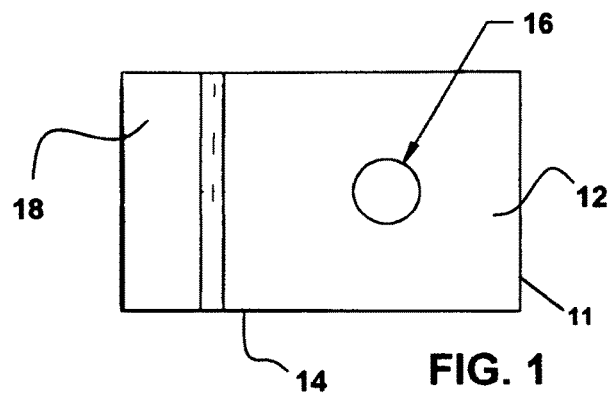
FIG. 1 depicts a top view of the mount showing a first portion of the body of the mount having a threaded member extending therefrom to a distal end, and showing a central portion of the body forming the mount, angling toward its engagement with the second portion of the body of the mount.

Referring now to the drawings in FIGS. 1-6, wherein similar parts are identified by like reference numerals, the caliper cover device 10 as noted is shown in an overhead view in FIG. 1.

Figure 2:
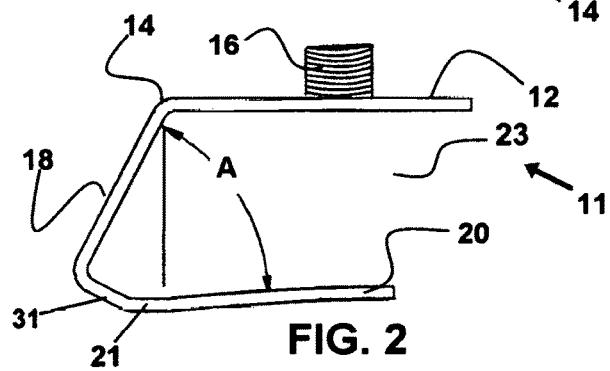
FIG. 2 shows the mount of FIG. 1 from a side view, showing the substantial C-shaped body of the mount and a threaded member extending to a distal end from a first end in a connection to a first portion of the body, and showing the angled central portion connected between the substantially parallel first and second portions, and showing the slight defection of the distal end of second portion toward the first portion.
Figure 3:
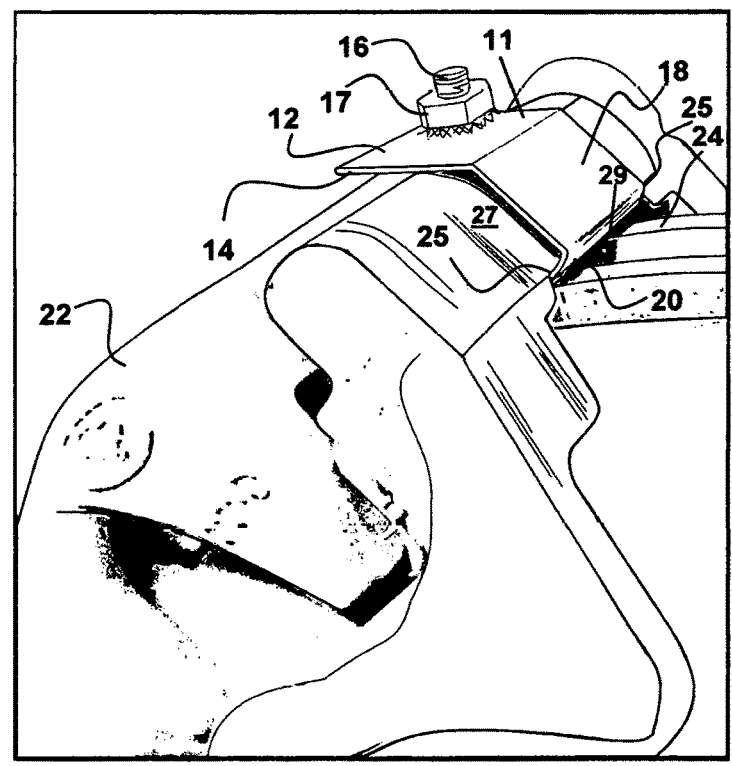
FIG. 3 is a perspective view of one mount of FIGS. 1-2 in an as-used or engaged position, connected with one side edge of a brake caliper, in a recess adjacent the exterior circumferential edge of the rotor running through the caliper.

As can be seen in FIGS. 1-3, a first portion 12 of the body 14 which defines each mount 11, is substantially planar and has a first side surface adapted to contact the exterior surface of a brake caliper 22. On a second side surface opposite the first side surface, a first end of a threaded member 16 is connected. The threaded member 16 extends from this connection to a distal end of the threaded member 16.

A central portion 18 of the body 14 defining both mounts 11, is engaged between the first portion 12 and a second portion 20 of the body 14 defining both mounts 11, where each of which is configured to engage a respective one of two opposing sides of a caliper 22, adjacent to and inline with a pathway 29 of a brake rotor 24 running through the caliper 22.

Shown in FIG. 2 the mount 11 defined by the body 14 has the threaded member 16, extending to a distal end from a connection at a first end, to the second surface of the first portion 12 of the body 14. This threaded member 16 is configured for threaded engagement with a nut 17.

The central portion 18 in a preferred mode of the device 10, connected between the first portion 12 of the body 14 of the mount 11, and second portions 20 of the mount 11, both of which extends from respective connections with the central portion 18 to respective a distal ends.

As can be seen in FIG. 2, the first portion 12 of the body 14 runs along a line or axis which is substantially parallel to the line or axis of the second portion 20 of the body 14 of the mount 11. By substantially parallel meant both the first portion 12 and second portion 20 have an axis running through them which are parallel to each other, or few degrees off of parallel, such as between 1 to 10 degrees from being parallel as shown in FIG. 2 where the second portion 20 deflects toward the first portion 12. This is a particularly preferred mode of the device 10 herein, there is a defection of the second portion 20 toward the first portion 12, such that the substantially planar second portion 20 angles toward the substantially planar first portion 12 and narrows a gap 23 between the distal end of the second portion 20 and the facing or first surface of the first portion 12. The gap 23 at the distal end is thus shorter than the gap 23 at the first end of the second portion 20 where it engages with the central portion 18.

An angle "A" may be formed in the connection of the angled central portion 18 between the substantially parallel first portion 12 and second portion 20 of the body 14. This angle of the central portion 18 to the lines running through the substantially parallel first portion 12 or second portion 20, currently is a range between 55 to 75 degrees depending on the exterior contour and configuration of the sides of the caliper 22 aligned with the pathway 29 through the caliper 22 to which the mounts 11 engage. Currently an angle A, of between 60 to 66 degrees has shown to allow the body 14 defining the mounts 11, to engage upon opposite end surfaces of a large number of calipers 22, adjacent and inline with the pathway 29 through the caliper 22 in which the rotor 24 runs, and where both of the mounts 11 are engaged to an as-used position such as in FIG. 3 or 4.

Figure 4:
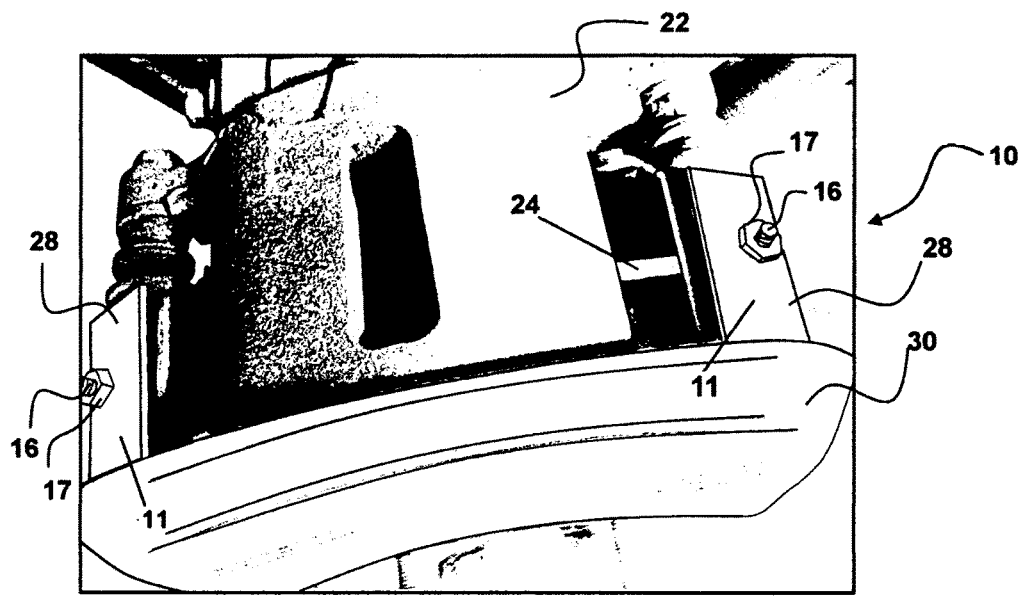
FIG. 4 is an overhead view of the caliper cover system herein, showing each of two support members engaged with the caliper cover on one end, and engaged with respective caliper-engaged mounts at or adjacent opposite ends.

Such a connection of a mount 11 on a side of the caliper 22 aligned with a pathway 29 for the rotor 24, is shown in the perspective view of one mount 11 shown in FIG. 3. The mount 11 is positioned to an as-used or engaged position, with one side edge 27 of the caliper 22 adjacent and substantially aligned with the pathway 29 through which the exterior circumferential edges 27 of the rotor 24 passes through the caliper 22. A second mount 11 formed in a similar configuration as in FIG. 4, is positioned on the opposite edge of the caliper 22, in a mirrored configuration and engagement with the edge of the caliper 22. The thin metal forming the body 14 of the mounts 11 is sized to, in all modes, fit between and spaced from the rotor 24 and edge 27 of the pathway 29 running through the caliper 22 which is aligned with the rotor 24.

The second portion 20 of the body 14 of each mount 11 as noted, extends along a line from a first end connected to the central portion 18, to a distal end of the second portion 20, at a slight angle toward the first portion 12 of the body 14 of the mount 11. The incline or inward angle of the second portion 12 of each body 14 defining both mounts 11, toward the first portion 12, forms the second portion 12 in a fashion configured to clip under a side edge 25 of the brake caliper 22 adjacent and aligned with the pathway 29 for the rotor 24 extending through and to both sides of the caliper 22 in which the circumferential edges 27 of the rotor 22 runs. Once so positioned to an engaged position, with the first surface of the first portion 12 of the body 14 forming each mount in contact with an exterior of the caliper 22, the second portion 20 will incline upward from the lip or side edge 25 of the pathway 29 of the caliper 22 and into an internal area of the caliper 22 adjacent the pathway 29 for the rotor 24.

This configuration thus forms an enhanced biased engagement between the body 14 of each mount 11, by an angling of the second portion 20 which places the distal end of the second portion 20, above and out of alignment with a lip or side edge 25 of the pathway 29 through the caliper 22. This significantly enhances engagement of the mounts 11 with the caliper 22 since removal will require a force sufficient to bend the deflected second portion 20 of the body 14 of each mount 11, to deflect temporarily away from the first portion 12. During removal of each mount 11 this deflection is necessary to slide the second portion 20 along the side edge 25 of the pathway 29 communicating opening into the interior of the caliper 22.

While in some instances this deflection of the distal end of the second portion 20 may not be required, and instead the two mounts 11 can be held in position by connection to respective support members 28 shown in FIG. 4, which are in fixed spacing on the cover 30, the biased engagement formed by the deflection of the distal end of the second portion 20, is preferred. This is because it also makes installation easier since the mounts 11 will not fall off their respective engagements to opposing side edges 25 of the pathway 29 of the caliper 22.

As shown in FIG. 4, there is seen an overhead view of the caliper system 10 herein, showing each of two support members 28 engaged with the cover 30 on one end a distance apart from each other. Also shown is the engagement through each support member 28 of a respective threaded member 16. Each threaded member 16 is in an engagement with one caliper-engaged mount 11 defined by a body 14, and each mount 11 is positioned in engagement on opposite side ends 25 of the caliper 22 adjacent the pathway 29 for the rotor 24.

As also shown, each threaded member 16 is engaged with the cooperatively threaded nut 17 to form a compressive sandwiched engagement of each support member 28 between a first portion 12 of the body 14 of a respective mount 11, and the respective nut 17. So engaged, the mounts 11 are held in position on the caliper 22 by the fixed positioning of the support members 28 to the cover 30 and the fixed gap therebetween.

Figure 5:
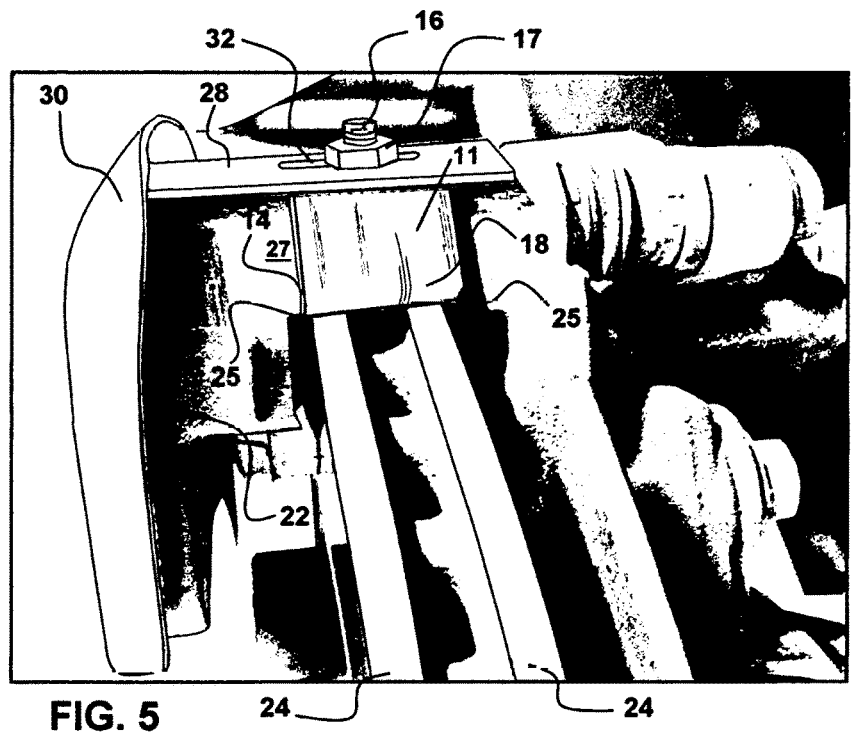
FIG. 5 is an end view of the caliper system of FIG. 4 showing a mount engaged with the edge of the caliper adjacent to and aligned with, a pathway through the caliper for the rotor, and showing a mode of the support members having an elongated aperture therein, affording adjustment of the position of the cover.

In all modes, each threaded member 16 communicates through an aperture 32 formed in a respective support members 28, which may be slightly larger or equal to the diameter of the threaded member 16, or, preferably formed in an elongated aperture 32 as in FIG. 5. The aperture 32 which is elongated allows for sliding of the support members 28 when engaged with a respective threaded member 16 communicating therethrough. Once a proper distance is found by adjusting the distance of the cover 30 from the side of the caliper 22, and the wheel when engaged to the axle of the caliper 22, the nut 17 is tightened to form a compressive sandwiched engagement of each support member 28.

This slot or elongated mode of the aperture 32 this is preferable, as it allows the mounts 11 to be employed on a wider number of calipers 22 of differing widths and configurations, and allows for translation and adjustment of the distance of the cover 30 from the exterior of the caliper 22, and would be preferable for that additional utility.

FIG. 5 is an end view of the caliper system 10 of FIGS. 3-4 showing a mount 11 formed by the body 14 operatively engaged with the side edge 25 of a caliper 22 which is adjacent and aligned with the pathway 29 sided for the width of the rotor 24 therethrough. On both of the two opposing side edges 25 of the caliper 22, where the rotor 24 and pathway 29 pass, the width of the body 14 as shown may be equal to or just slightly larger than a width of the rotor 22, such that the second portion 20 can slide in-between the rotor 24 and over the side edge 25 of the pathway through the caliper 22, and into a void or cavity within the caliper 22. This positions the distal end of the second portion 20 if formed to angle, slightly above and out of alignment with the surface of the side edge 25 of the caliper 22 as noted above to enhance the initial engagement. In all modes of the device 10 as can be seen, the fixed spacing of the two support members 28 in their engagement with the cover 30, will hold the mounts 11 on the caliper 22 by preventing movement.

As shown in FIG. 5, the support members 28 have an aperture 32 which is elongated a distance wider than the distal end of the threaded member 16, affording the noted translation and adjustment of the position of the cover 30 along a line perpendicular to the path of the rotor 24 through the caliper 22.

Figure 6:
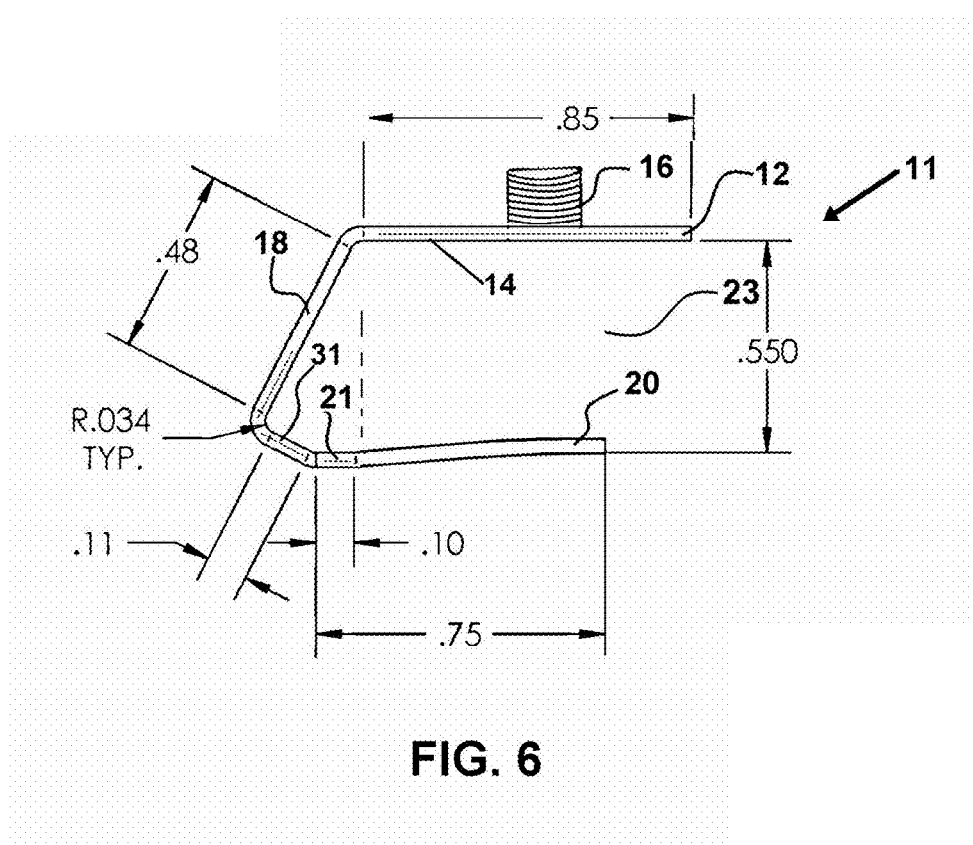
FIG. 6 depicts an especially preferred mode of the body forming the mount herein, showing preferred dimensions of the first and second portions as well as the central portion of the body, which after much experimentation was found to accommodate the largest number of caliper engagements as well as depicting the deflection of a portion of the second portion just past an imaginary line running perpendicular from the first portion at its connection with the central portion of the body.

Finally, FIG. 6 depicts an especially preferred mode of the body 14 forming the mount 11 herein. As shown, a length of the first portion 12 of the body 14 is longer than a length of the second portion 20. As shown, the first portion 12 is 0.10 inches longer than the second but this distance can vary where the first portion is between 5-15% longer than the second portion 20, depending on the configuration of the intended caliper 22.

As also shown, the deflection of a portion of the second portion 20 of the body 14 of the mount 11, at an angle toward the first portion 12, rather than parallel, begins a point on the second portion 20 where an imaginary line extending normal from an intersection of the first portion 12 with the center portion 18, intersects the second portion 20. This places a first section 21 of the second portion 20 substantially parallel to the first portion 12 with a remainder of the second portion 20 running to a distal end, angling toward the planar first portion 12.

It has been found positioning this first section 21, which runs parallel to the line followed by the first portion 12, at the intersection of the second portion 20 with the central portion 18, having a width of between 0.05 to 0.15 inches, allows the first section 21 to engage along the side edge 25 of the rotor pathway 29 on the caliper 22, which tend to be planar and linear for the distance of that edge 25. This allows the deflection of the adjacent second portion 20 extending to a distal end, within a void in the caliper 22.

Such a configuration in experimentation has yielded a much more secure engagement than simply angling the entire length of the second portion 20 from its connection with the central portion 18, since the inward angle of the second portion 20 toward the first portion 12, will start after covering the side edge 25 of the caliper 22. It thus must be deflected for removal. Currently forming this first section 21 with a distance of 0.10 inches has after exhaustive experimentation shown to work well with a large number of caliper 22 designs where the rotor 24 communicates past an edge 25 on both sides.

Finally, another mode of the body 12 defining the mount, includes primary section 29 located in-between the first section 21 and the central portion 18. This primary section 31 runs at an angle substantially perpendicular to a line running through the central section 18, thereby forming a right angle at the intersection of the primary portion 29 of the second portion 20 and the central portion 18. This right angle has been found in experimentation in many instances where the mount 11 defined by the body 14 has this perpendicular configuration, to better engage the side edge 25 of the caliper 22 and communicate into the internal cavity or void of the caliper 22 through which the rotor 24 rotates. The first section 21 thereafter communicates through the gap defined by the side edge 25, whereafter the inclining or angled portion of the second portion 20 communicates into the cavity at an angle placing the distal end of the second portion 20, out of alignment with the side edge 25, and requiring straightening for removal.

It is to be understood that elements of different construction and configuration and different steps and process procedures and other arrangements thereof, other than those illustrated and described, may be employed for providing the easily mounted decorative and functional caliper covers herein.

As such, while the present invention has been described herein with reference to particular embodiments thereof, a latitude of modifications, various changes and substitutions are intended in the foregoing disclosure, and it will be appreciated that in some instance some features of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

What is claimed is:

1. A caliper cover apparatus for engagement with a brake caliper, comprising:
   a cover;
   a first support member having a first end engaged with said cover, said first support member extending to a second end;
   a second support member having a first end engaged with said cover, said second support member extending to a second end;
   a fixed gap formed in-between said first support member and said second support member;
   a first mount having a body, said body of said first mount being substantially C-shaped;
   a second mount having a body, said body of said second mount being substantially C-shaped;
   a first threaded member extending to a distal end from a first end connected to a first portion of said body of said first mount;
   a second threaded member extending to a distal end from a first end connected to a first portion of said body of said second mount;
   said first mount positionable to an engaged position on a first side of said brake caliper said second mount positionable to an engaged position on a second side of said brake caliper opposite said first mount; and
   a concurrent engagement of said first threaded member through an aperture in said first support member, and of said second threaded member through an aperture in said second support member, securing said first mount and said second mount in their respective said engaged positions on said brake caliper, and concurrently holding said cover adjacent a side surface of said caliper.

2. The caliper cover apparatus of claim 1 additionally comprising:
   a first nut engaged with said first threaded member, said first nut forming a compressive sandwiched engagement of said first support member in-between said first nut and said first portion of said body of said first mount; and
   a second nut engaged with said second threaded member, said second nut forming a compressive sandwiched engagement of said second support member in-between said second nut and said first portion of said body of said second mount.

3. The caliper cover apparatus of claim 2 additionally comprising:
   said first portion of said body of said first mount connected with a second portion of said body of said first mount, by a first central portion running therebetween;
   said first portion of said body of said second mount connected with a second portion of said body of said second mount by a second central portion running therebetween;
   said second portion of said body of said first mount having a first end engaged with said first central portion and extending to a distal end thereof;
   said first portion of said body of said first mount running substantially parallel to said second portion of said body of said first mount;
   said second portion of said body of said second mount having a first end engaged with said second central portion and extending to a distal end thereof; and
   said first portion of said body of said second mount running substantially parallel to said second portion of said body of said second mount.

4. The caliper cover apparatus of claim 3 additionally comprising:
   said second portion of said body of said first mount is in an angled positioning locating said distal end thereof, closer to said first portion of said body of said first mount, than said first end thereof; and
   said second portion of said body of said second mount is in an angled positioning locating said distal end thereof, closer to said first portion of said body of said second mount, than said first end thereof.

5. A caliper cover apparatus of claim 4, additionally comprising:
   said first central portion running at an angle between 55-75 degrees, along a line between connections at respective first ends of said substantially parallel first portion of said body of said first mount, and second portion of said body of said first mount; and
   said second central portion running at an angle between 55-75 degrees, along a line between connections at respective first ends of said substantially parallel first portion of said body of said second mount, and second portion of said body of said second mount.

6. A caliper cover apparatus of claim 5, additionally comprising:
   a first primary section located in-between said first central portion and said first end of said second portion of said body of said first mount;
   said first primary section being perpendicular to said first central portion;
   a second primary section located in-between said second central portion and said first end of said second portion of said body of said second mount; and
   said second primary section being perpendicular to said second central portion.

7. A caliper cover apparatus of claim 3, additionally comprising:
   said first central portion running at an angle between 55-75 degrees, along a line between connections at respective first ends of said substantially parallel first portion of said body of said first mount, and second portion of said body of said first mount; and
   said second central portion running at an angle between 55-75 degrees, along a line between connections at respective first ends of said substantially parallel first portion of said body of said second mount, and second portion of said body of said second mount.

8. A caliper cover apparatus of claim 7, additionally comprising:
   a first primary section located in-between said first central portion and said first end of said second portion of said body of said first mount;
   said first primary section being perpendicular to said first central portion;
   a second primary section located in-between said second central portion and said first end of said second portion of said body of said second mount; and
   said second primary section being perpendicular to said second central portion.

9. The caliper cover apparatus of claim 1 additionally comprising:
   said first portion of said body of said first mount connected with a second portion of said body of said first mount, by a first central portion connected therebetween;
   said first portion of said body of said second mount connected with a second portion of said body of said second mount by a second central portion connected therebetween;
   said second portion of said body of said first mount having a first end engaged with said first central portion and extending to a distal end thereof;
   said first portion of said body of said first mount running substantially parallel to said second portion of said body of said first mount;
   said second portion of said body of said second mount having a first end engaged with said second central portion and extending to a distal end thereof; and
   said first portion of said body of said second mount running substantially parallel to said second portion of said body of said second mount.

10. The caliper cover apparatus of claim 9 additionally comprising:
    said second portion of said body of said first mount is in an angled positioning locating said distal end thereof, closer to said first portion of said body of said first mount, than said first end thereof; and
    said second portion of said body of said second mount is in an angled positioning locating said distal end thereof, closer to said first portion of said body of said second mount, than said first end thereof.

11. A caliper cover apparatus of claim 10, additionally comprising:
    said first central portion running at an angle between 55-75 degrees, along a line between connections at respective first ends of said substantially parallel first portion of said body of said first mount, and said second portion of said body of said first mount, and said second central portion running at an angle between 55-75 degrees, along a line between connections at respective first ends of said substantially parallel first portion of said body of said second mount, and said second portion of said body of said second mount.

12. A caliper cover apparatus of claim 11, additionally comprising:
a first primary section located in-between said first central portion and said first end of said second portion of said body of said first mount;
said first primary section being perpendicular to said first central portion;
a second primary section located in-between said second central portion and said first end of said second portion of said body of said second mount; and
said second primary section being perpendicular to said second central portion.

13. A caliper cover apparatus of claim 9, additionally comprising:
said first central portion running at an angle between 55-75 degrees, along a line between connections at respective first ends of said substantially parallel first portion of said body of said first mount, and said second portion of said body of said first mount; and
said second central portion running at an angle between 55-75 degrees, along a line between connections at respective first ends of said substantially parallel first portion of said body of said second mount, and said second portion of said body of said second mount.

14. A caliper cover apparatus of claim 13, additionally comprising:
a first primary section located in-between said first central portion and said first end of said second portion of said body of said first mount;
said first primary section being perpendicular to said first central portion;
a second primary section located in-between said second central portion and said first end of said second portion of said body of said second mount; and
said second primary section being perpendicular to said second central portion.

* * * * *